J. W. HAINES.
Mold for Blowing Glass Vessels.

No. 207,656. Patented Sept. 3, 1878.

UNITED STATES PATENT OFFICE.

JOHN W. HAINES, OF CAMBRIDGE, MASSACHUSETTS.

IMPROVEMENT IN MOLDS FOR BLOWING GLASS VESSELS.

Specification forming part of Letters Patent No. 207,656, dated September 3, 1878; application filed August 17, 1878.

*To all whom it may concern:*

Be it known that I, JOHN W. HAINES, of Cambridge, in the county of Middlesex and State of Massachusetts, have invented a new and useful Improvement in Molds for Blowing Glass Vessels, of which the following is a specification:

This mold is intended to be used in blowing glass vessels which have inwardly-projecting stems or arms, and it is particularly intended and adapted for blowing the dredge-box or salt-bottle shown and described in the Letters Patent issued to me June 4, 1878, and numbered 204,564.

It is impossible with an ordinarily-constructed hinged mold to make the projections $b$ in said patent and make them of suitable shape, for, unless they are made very large at the outside or mouth, the mold cannot be removed, as the pins or projections upon the mold which fill and shape the said stems $b$ will not remove when the attempt is made to swing the mold outward upon its hinges, but will stick in the stems. If the stems are made short enough and sufficiently V-shaped to allow of the removal of the mold, they will be practically worthless in a salt-bottle for pulverizing the salt.

In order to be able to make a dredge-bottle with inwardly-projecting arms of good shape—i. e., of nearly even size throughout their length—I have in this invention produced a mold having movable pins, which are withdrawn by means of springs without opening the mold.

Figure 1:
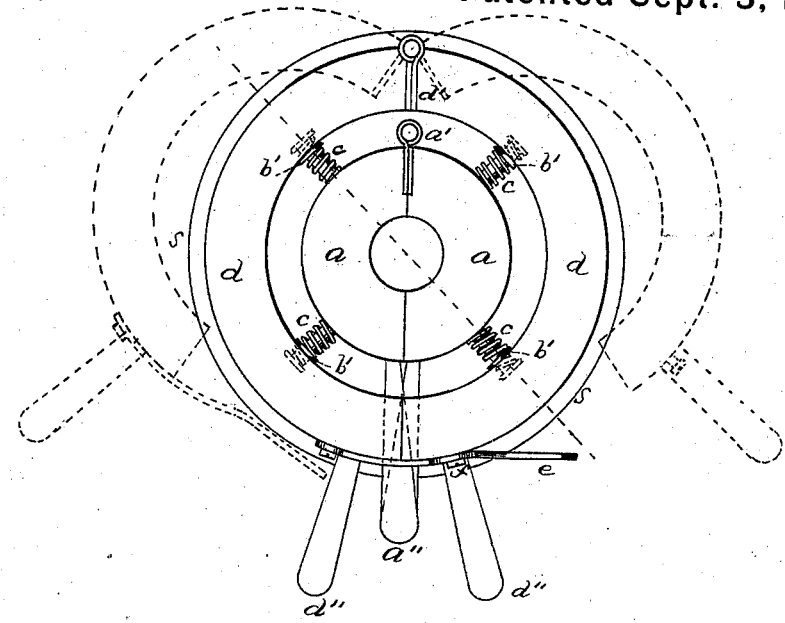
Figure 2:
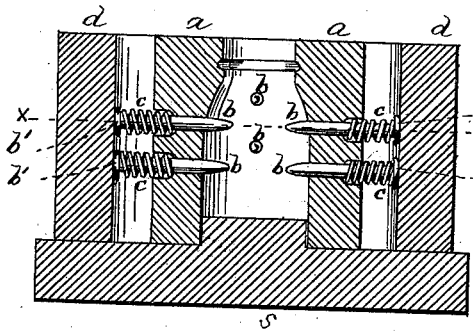
Figure 3:
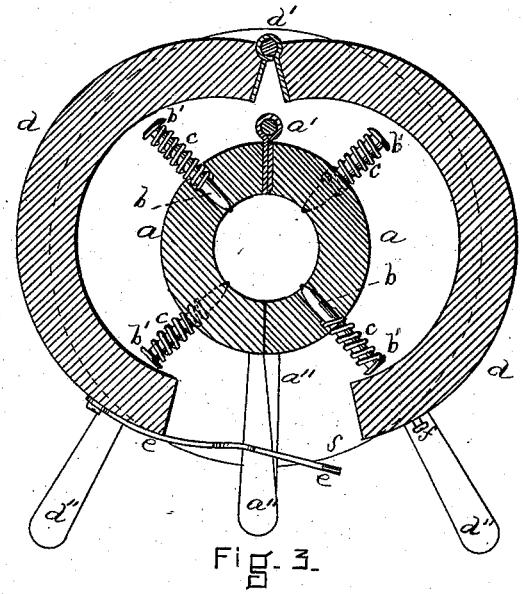

In the accompanying drawings, Figure 1 is a plan view of my mold, with its clamp for operating the movable pins closed. Dotted lines represent the position of the clamp when open. Fig. 2 is a cross-section of the same. Fig. 3 is a horizontal section upon line $x\ x$, Fig. 2, taken when the clamp is partly open.

Similar letters of reference indicate like parts.

$a$ is the mold, hinged at $a'$. $b$ are pins provided with heads $b'$, and placed in suitable openings made through the mold. Spiral springs $c$, or springs of any suitable kind, are placed upon said pins between the heads $b'$ and the outside of the mold $a$. Placed upon the same base $s$ as the mold $a$, and surrounding said mold, are the clamps $d$, hinged at $d'$. $a''$ and $d''$ are respectively the handles to the mold and clamps.

A latch, $e$, catching upon a projection, $f$, is provided to keep the clamps together; but it is not necessary to the invention.

In practical operation, in order to make the salt-box described in the Letters Patent above referred to, or any glass vessel having inward projections, the glass, when suitably prepared, is placed in the mold $a$, the mold being open. The clamps $d$ are then closed by means of the handles $d''$, thus closing the mold $a$, which is within, and forcing the pins $b$ from the position shown in Fig. 3 to the position shown in Fig. 2. The bottle is then blown, and the inwardly-projecting stems shown in said Letters Patent are produced. The clamps are quickly allowed to fly back again into the position shown by dotted lines, Fig. 1, and the springs $c$ draw the pins $b$ out from the interior of the mold. When the bottle is sufficiently cool the mold is opened and the bottle removed. Thus stems of proper length and shape can be produced.

There is no danger of the pins sticking to the glass, as they are removed so quickly.

I do not propose to confine myself to the particular means shown of forcing the pins into the mold, as there are other methods and devices which might produce the desired effect upon the pins.

I am aware that stationary pins have been used for making inward projections in bottles; but for the reasons above mentioned they will not produce the desired shape.

Having thus fully described my improvement, what I claim, and desire to secure by Letters Patent, is—

1. In combination with a mold for use in blowing glass vessels, one or more movable pins, $b$, arranged to be forced into the interior of the mold, for the purpose herein set forth.

2. The combination, with the mold $a$, of the spring-pins $b\ b'$ and springs $c$, substantially as and for the purpose above described.

3. The combination of the mold $a$, provided with the pins $b\ b'$ and springs $c$, and the hinged clamps $d$, arranged and constructed substantially as and for the purpose specified.

JOHN W. HAINES.

Witnesses:
HENRY W. WILLIAMS,
JOHN E. FREMING.